(12) United States Patent
Matsuki

(10) Patent No.: US 10,191,355 B2
(45) Date of Patent: Jan. 29, 2019

(54) LIGHT ADJUSTING APPARATUS

(71) Applicant: OLYMPUS CORPORATION, Tokyo (JP)

(72) Inventor: Kaoru Matsuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 123 days.

(21) Appl. No.: 15/287,787

(22) Filed: Oct. 7, 2016

(65) Prior Publication Data

US 2017/0023845 A1    Jan. 26, 2017

Related U.S. Application Data

(63) Continuation of application No. PCT/JP2015/060365, filed on Apr. 1, 2015.

(30) Foreign Application Priority Data

Apr. 8, 2014  (JP) .................................. 2014-079767

(51) Int. Cl.
   *G02B 5/00*      (2006.01)
   *G03B 5/02*      (2006.01)
   (Continued)

(52) U.S. Cl.
   CPC ............... *G03B 9/07* (2013.01); *G02B 5/005* (2013.01); *G02B 26/02* (2013.01); *G03B 5/02* (2013.01);
   (Continued)

(58) Field of Classification Search
   CPC ...... G02B 26/02; G02B 26/023; G02B 26/04; G02B 26/0841; G02B 5/005; G02B 26/00;
   (Continued)

(56) References Cited

U.S. PATENT DOCUMENTS 4,669,848 A   6/1987  Wakabayashi
4,684,338 A   8/1987  Steidl et al.
(Continued)

FOREIGN PATENT DOCUMENTS

JP    S59-127047 A    7/1984
JP    S60-122930 A    7/1985
(Continued)

OTHER PUBLICATIONS

International Search Report dated Jun. 30, 2015 issued in PCT/JP2015/060365.

*Primary Examiner* — Thomas K Pham
*Assistant Examiner* — Sharrief I Broome
(74) *Attorney, Agent, or Firm* — Scully, Scott, Murphy & Presser, P.C.

(57) ABSTRACT

A light adjusting apparatus includes substrates arranged in parallel, each including an opening to pass light, a rotary shaft member which is rotatable around an axis perpendicular to the substrates and movable in an axial direction, a light adjusting section fixed integrally to the rotary shaft member in a space between the substrates and configured to move to an insertion position or a retracted position along with the rotation of the rotary shaft member and adjust light that passes through the opening, and a holding member configured to restrict the rotation of the light adjusting section that moves to one substrate side in the space from the insertion/retracted position and allow the rotation of the light adjusting section that moves to the other substrate side in the space.

7 Claims, 9 Drawing Sheets

(51) Int. Cl.
| | |
|---|---|
| *G03B 9/02* | (2006.01) |
| *G03B 9/07* | (2006.01) |
| *G02B 26/02* | (2006.01) |
| *G03B 11/00* | (2006.01) |

(52) U.S. Cl.
CPC ............... *G03B 9/02* (2013.01); *G03B 11/00* (2013.01); *G03B 2205/0092* (2013.01)

(58) Field of Classification Search
CPC .. G02B 26/08; G02B 26/0833; G02B 26/085; G02B 21/06; G02B 26/005; G02B 27/0093; G02B 6/0038; G02B 6/005; G02B 7/1821; G02B 13/22; G02B 17/0652; G09G 3/3433; G09G 3/346; G09G 2300/0426; G09G 2310/0235; G09G 3/3406; G09G 2300/0842; G09G 2310/0251; G09G 2320/0233; G09G 2320/0626; G09G 2360/144; G09G 3/3466; G09G 2300/023; G09G 2300/0439; G09G 2300/0456; B81B 2203/0163; B81B 2203/051; B81B 7/0038; B81B 7/02; B81B 2203/0109; B81B 2203/0181; B81B 2207/053; B81B 3/00; B81B 2201/047; B81B 2201/045; B81B 3/0021; B81B 2203/0118; B81B 3/0016; B81B 3/0035; B81B 3/007

USPC ....... 359/230, 227, 290, 234, 513, 228, 238, 359/241, 245, 275, 291, 351, 380, 381, 359/385, 489.12, 610, 38

See application file for complete search history.

(56) References Cited

U.S. PATENT DOCUMENTS

| | | |
|---|---|---|
| 4,768,048 A | 8/1988 | Wakabayashi |
| 2009/0073578 A1 | 3/2009 | Ide |
| 2011/0267669 A1* | 11/2011 | Ide .................. G02B 5/005 359/233 |
| 2012/0002309 A1 | 1/2012 | Okita |

FOREIGN PATENT DOCUMENTS

| | | |
|---|---|---|
| JP | H09-022042 A | 1/1997 |
| JP | 2005-234165 A | 9/2005 |
| JP | 2006-234951 A | 9/2006 |
| JP | 2008-170650 A | 7/2008 |
| JP | 2009-080470 A | 4/2009 |
| JP | 2012-014092 A | 1/2012 |

* cited by examiner

LIGHT ADJUSTING APPARATUS

CROSS REFERENCE TO RELATED APPLICATION

This application is a continuation application of PCT/JP2015/060365 filed on Apr. 1, 2015 and claims benefit of Japanese Application No. 2014-079767 filed in Japan on Apr. 8, 2014, the entire contents of which are incorporated herein by this reference.

BACKGROUND OF THE INVENTION

1. Field of the Invention

The present invention relates to a light adjusting apparatus that adjusts light by inserting/removing a light adjusting section into/from an optical path.

2. Description of the Related Art

Image pickup apparatuses having an image pickup function are widely used in various fields, and among them, there is a field of small image pickup apparatuses with a relatively small shape. Examples of such small image pickup apparatuses include electronic endoscopes including a micro video scope, optical microscopes provided with an image pickup function and portable apparatuses provided with an image pickup function.

With conventional small image pickup apparatuses, priority is given to miniaturization, and therefore fixed focus lenses, fixed aperture diaphragms, fixed characteristic filters or the like have been adopted as optical elements such as lenses, diaphragms and optical filters.

In contrast, in recent years, high image quality is also required for such small image pickup apparatuses, and, as optical elements of the aforementioned light adjusting apparatus, there is a growing demand for adopting focus lenses, variable diaphragms, variable characteristic filters or the like, that is, functions as light adjusting apparatuses that adjust light.

Thus, many techniques for downsizing light adjusting apparatuses are being proposed so as to be applicable to small image pickup apparatuses.

As an example, Japanese Patent Application Laid-Open Publication No. 9-22042 describes an electromagnetic drive apparatus disposed around a taking lens, including a yoke, a coil and a permanent magnet facing the yoke, and configured to supply current to the coil to generate a magnetic force in the yoke and rotate the permanent magnet. By providing the permanent magnet with, for example, a shutter blade integrally rotatably as a light adjusting section, it is possible to switch between a state in which the shutter blade is located in an optical path and a state in which the shutter blade is retracted from the optical path.

SUMMARY OF THE INVENTION

A light adjusting apparatus according to an aspect of the present invention includes a first substrate and a second substrate arranged in parallel at a predetermined distance, each including an opening formed to pass light, a rotary shaft member rotatable around a central axis of rotation perpendicular to the first substrate and the second substrate, a light adjusting section integrally rotatably fixed to the rotary shaft member, movable in an axial direction of the rotary shaft member integrally with the rotary shaft member in a space between the first substrate and the second substrate, and configured to move to an insertion position located in an optical path of light passing through the opening and to a retracted position retracted from the optical path as the rotary shaft member rotates, adjust and output incident light incident from the opening, and a holding member configured to restrict, when the space is divided into a first region having a position in the axial direction on the first substrate side and a second region having a position in the axial direction on the second substrate side, rotation from at least one of the insertion position and the retracted position of the light adjusting section when the light adjusting section is located in the first region, and allows the light adjusting section to rotate when the light adjusting section is located in the second region.

DETAILED DESCRIPTION OF THE PREFERRED EMBODIMENTS

Hereinafter, embodiments of the present invention will be described with reference to the accompanying drawings.

[Embodiment 1]

FIG. 1 to FIG. 9 illustrate embodiment 1 of the present invention.

Figure 1:
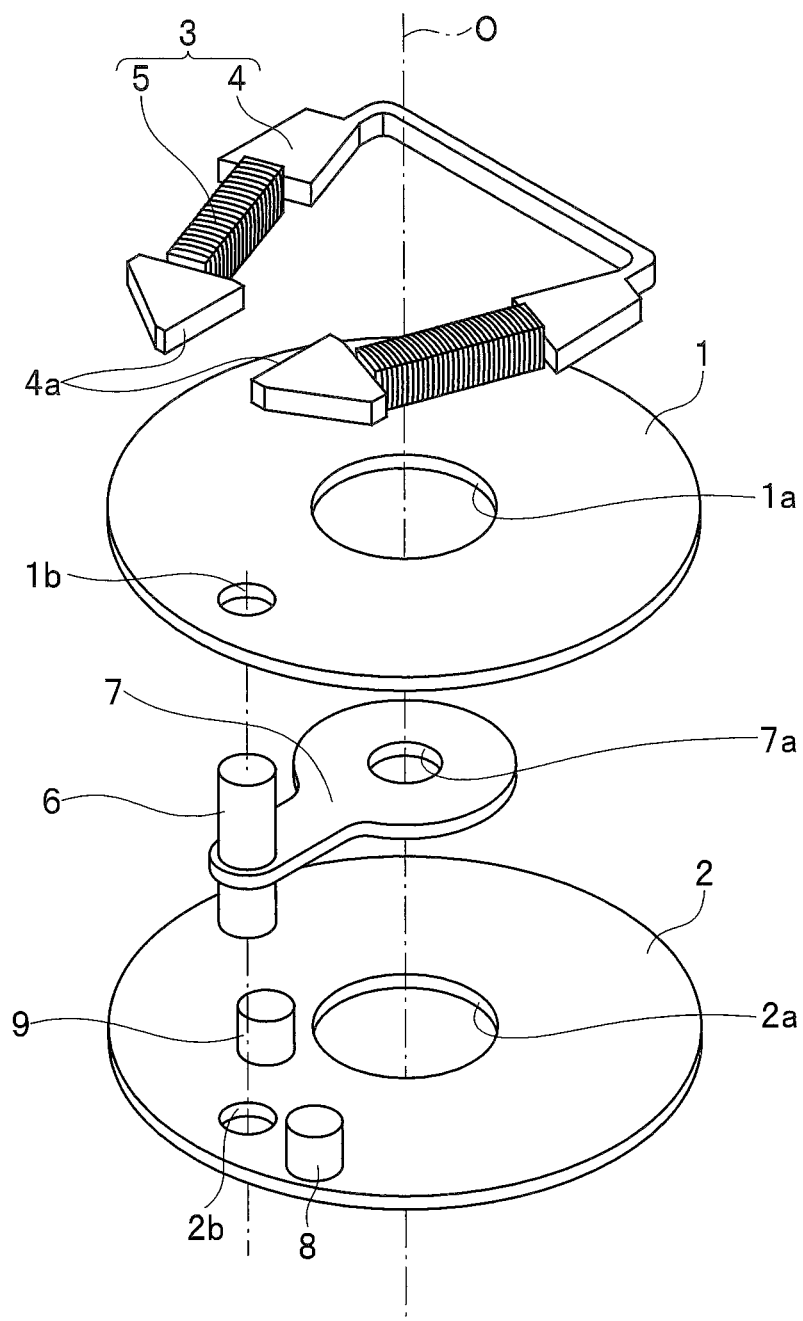
FIG. 1 is an exploded perspective view illustrating a configuration of a light adjusting apparatus according to embodiment 1 of the present invention, shown as being extended in an optical axis direction.
Figure 2:
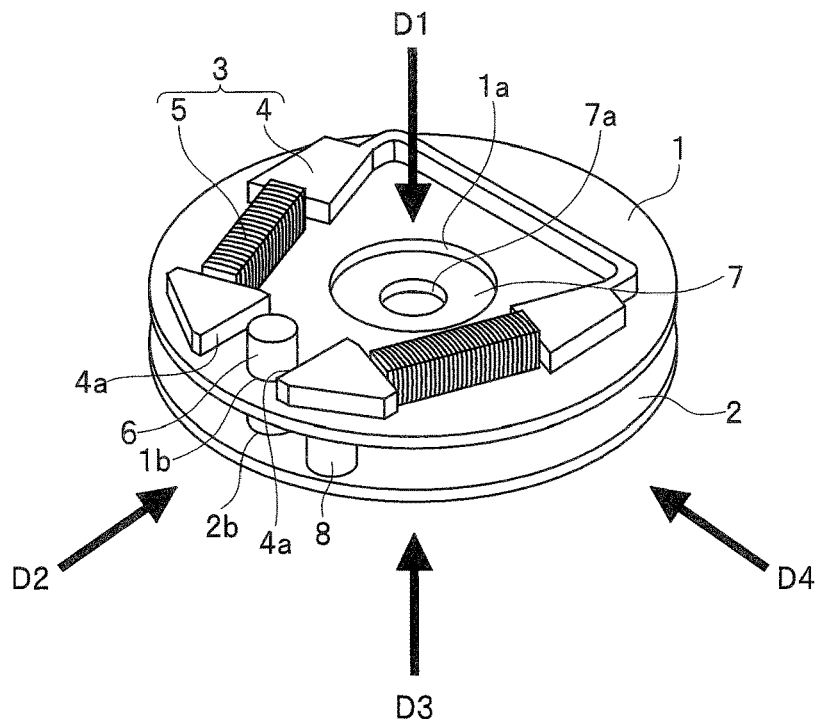
FIG. 2 is a perspective view illustrating the configuration of the light adjusting apparatus of embodiment 1 of the present invention.
Figure 3:
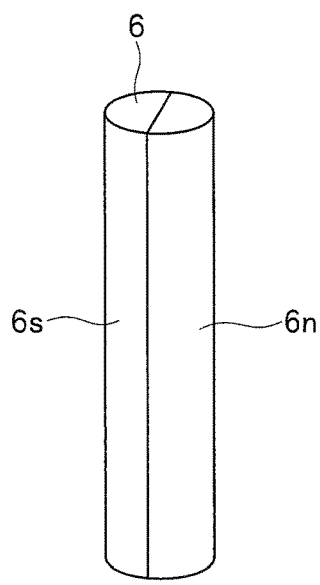
FIG. 3 is a perspective view illustrating a magnetic configuration of a rotary shaft member of embodiment 1 of the present invention.

First, a basic configuration of a light adjusting apparatus will be described with reference to FIG. 1 to FIG. 3. Here, FIG. 1 is an exploded perspective view illustrating a configuration of a light adjusting apparatus, shown as being extended in an optical axis direction, FIG. 2 is a perspective view illustrating the configuration of the light adjusting apparatus and FIG. 3 is a perspective view illustrating a magnetic configuration of a rotary shaft member 6.

The light adjusting apparatus is intended to adjust incident light, and some examples of the adjustment referred to here include light quantity adjustment and pupil adjustment by a diaphragm, light quantity adjustment by an ND filter, condensing adjustment by a lens, polarization adjustment by a polarization filter, band adjustment by a color filter, passage time adjustment by a shutter or a combination of the adjustments, but the adjustment is not limited to them and any optical adjustment is widely applicable.

Hereinafter, a case will be described where light adjustment is adjustment using a diaphragm as an example.

The light adjusting apparatus includes a first substrate 1, a second substrate 2, an electromagnetic drive source 3 including a coil core member 4 and a coil 5, a rotary shaft member 6, a light adjusting section 7, and stoppers 8 and 9.

The first substrate 1 includes an opening 1a configured to pass light and a shaft hole 1b through which a one end side in an axial direction of the rotary shaft member 6 is inserted, and the electromagnetic drive source 3 is disposed on one side.

The second substrate 2 is disposed so as to face the other surface side of the first substrate 1 (that is, on the side opposite to the surface on which the electromagnetic drive source 3 of the first substrate 1 is disposed) via a spacer, which is not shown, or the like parallel to the first substrate 1 with a space of a predetermined interval, and includes an opening 2a formed in a center to pass light and a shaft hole 2b through which the other end side in the axial direction of the rotary shaft member 6 is inserted.

The opening 1a of the first substrate 1 and the opening 2a of the second substrate 2 are formed at the center of the respective substrates 1 and 2 as, for example, circular openings, and an optical axis O of a main optical system, which is not shown, is configured to pass through, for example, the centers of the openings 1a and 2a perpendicular to the substrate surface of the first substrate 1 and the second substrate 2. Note that the opening 1a or the opening 2a may be an optical opening that functions as an aperture diaphragm in the main optical system, which is not shown.

The shaft hole 1b and the shaft hole 2b are pivotally supported by fitting the rotary shaft member 6 into the respective shaft holes so that the light adjusting section 7 is rotatable around a central axis of rotation perpendicular to the first substrate 1 and the second substrate 2 (that is, parallel to the optical axis O) and also movable in the axial direction (however, the movable range is restricted to between a position at which the light adjusting section 7 comes into contact with the first substrate 1 and a position at which the light adjusting section 7 comes into contact with the second substrate 2 as will be described later).

The electromagnetic drive source 3 is disposed on a surface of the first substrate 1 opposite to the space between the first substrate 1 and the second substrate 2, includes the coil core member 4 formed of a magnetic body and the coil 5 wound around the coil core member 4, and configured to rotate the rotary shaft member 6 by transmitting a magnetic force generated by passing a current through the coil 5 to the rotary shaft member 6 via the coil core member 4.

Here, the rotary shaft member 6 is configured as a bar-like (e.g., columnar) permanent magnet (axial magnet) magnetized so as to have different magnetic poles around the axis. As shown in FIG. 3, the rotary shaft member 6 has, for example, a two-pole configuration and is magnetized such that one semi-cylindrical portion of the column corresponds to an S-pole 6s and the other semi-cylindrical portion corresponds to an N-pole 6n.

To be more specific, the rotary shaft member 6 whose action will be described in detail later, has a magnetic pole configuration around the axis such that when a current is passed through the coil 5 at the retracted position (see FIG. 5) to cause the rotary shaft member 6 to rotate from a retracted position to an insertion position (see FIG. 4), and if the space between the first substrate 1 and the second substrate 2 is divided in the axial direction, a repulsive force acts in the axial direction from a first region A1 which is on the first substrate 1 side (see FIG. 8) toward a second region A2 which is on the second substrate 2 side (see FIG. 8) or when a current is passed through the coil 5 at the retracted position to cause the rotary shaft member 6 to rotate from the insertion position to the retracted position, a repulsive force acts in the axial direction from the first region A1 toward the second region A2 (see D and E fields in FIG. 7).

Furthermore, in the rotary shaft member 6 made of an axial magnet, since the center in the axial direction is disposed at a position offset from the coil core member 4 as will be described below, when no current is made to flow through the coil 5, an attracting force in the axial direction from the second region A2 to the first region A1 acts due to a magnetic action acting between the rotary shaft member 6 and the coil core member 4 formed of a magnetic body.

The coil core member 4 is also called a "coil core" or "yoke," formed of a magnetic body such as permalloy or silicon steel into an open curve shape (that is, a shape including a notch in part of the closed curve) having two core member ends 4a, and in the illustrated example, the coil core member 4 has a substantially triangular shape, one vertex of which has an open end. A pair of core member ends 4a which are open ends of the substantially triangular shape contactlessly sandwich both sides of an outside face of the rotary shaft member 6 (both sides of the circumferential surface of the rotary shaft member 6 because the rotary shaft member 6 has a columnar shape in the illustrated example) at a position offset from the center in the axial direction. Thus, the coil core member 4 and the rotary shaft member 6 together constitute a closed magnetic circuit to transmit magnetism generated by the coil 5.

The coil 5 is wound around at least one location (two locations in the illustrated example) along the magnetic path of the open curve-shaped coil core member 4 and configured to generate a magnetic force by passing a current through the coil 5.

The light adjusting section 7 is a light adjusting member configured to adjust (as described above, by optically changing light) and emit incident light incident from the opening 1a or the opening 2a and is integrally rotatably fixed to the aforementioned rotary shaft member 6. The light adjusting section 7 is configured to rotate within the space of the aforementioned predetermined distance between the first substrate 1 and the second substrate 2 as the rotary shaft member 6 rotates. Furthermore, the light adjusting section 7 is configured to be also movable in the axial direction of the rotary shaft member 6 integrally with the rotary shaft member 6 within the space between the first substrate 1 and the second substrate 2 (more specifically, between the position at which it comes into contact with the first substrate 1 and the position at which it comes into contact with the second substrate 2) (also see FIG. 7 or the like which will be described later). The light adjusting section 7 according to the present embodiment is provided with a diaphragm opening 7a and, as described above, constitutes a diaphragm blade that changes a passage range of a light flux when inserted in an optical path of a main optical system, which is not shown.

A stopper 8 is a first restricting member configured to position and restrict the light adjusting section 7 that rotates around the rotary shaft member 6 to a retracted position retracted from the optical path of incident light passing through the openings 1a and 2a.

The stopper 9 is a second restricting member configured to position and restrict the light adjusting section 7 to an insertion position inserted in the optical path of incident light passing through the openings 1a and 2a.

Thus, the light adjusting section 7 moves within the predetermined rotatable range between the retracted position restricted by the stopper 8 and the insertion position restricted by the stopper 9 as the rotary shaft member 6 rotates.

Figure 4:
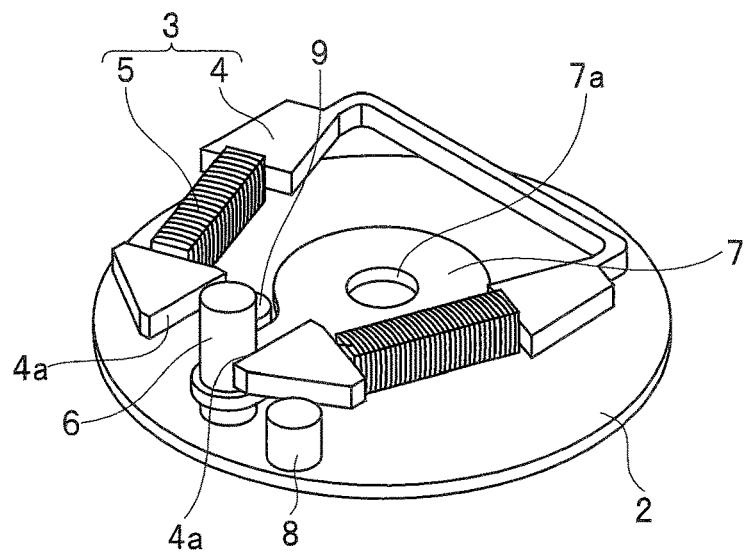
FIG. 4 is a perspective view illustrating the light adjusting apparatus of embodiment 1 of the present invention without the first substrate when the light adjusting section is located at an insertion position.
Figure 5:
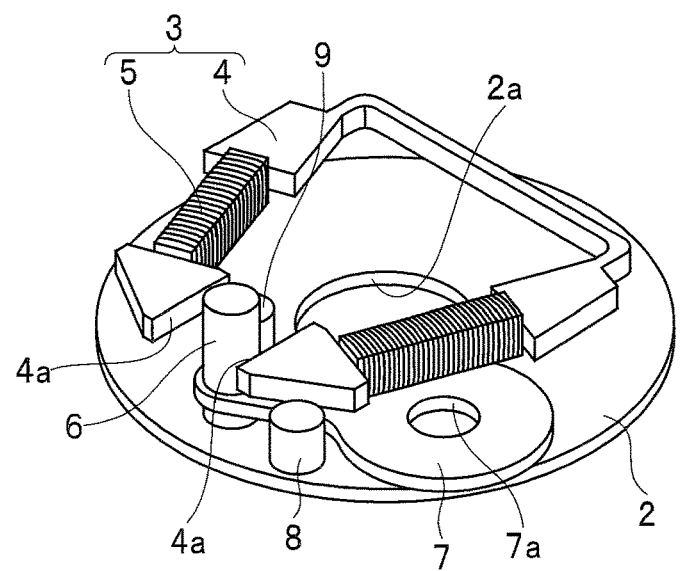
FIG. 5 is a perspective view illustrating the light adjusting apparatus of embodiment 1 of the present invention without the first substrate when the light adjusting section is located at a retracted position.

Next, a basic operation of the light adjusting apparatus will be described with reference to FIG. 4 and FIG. 5. FIG. 4 is a perspective view illustrating the light adjusting apparatus without the first substrate when the light adjusting section 7 is located at the insertion position and FIG. 5 is a perspective view illustrating the light adjusting apparatus without the first substrate 1 when the light adjusting section 7 is located at the retracted position.

With the aforementioned configuration, the light adjusting apparatus causes the electromagnetic drive source 3 to rotate the rotary shaft member 6 and causes the light adjusting section 7 to displace to the retracted position and the insertion position to adjust incident light.

That is, when a current in one direction is made to flow through the coil 5, one of the two core member ends 4a of the coil core member 4 is magnetized to an S-pole and the other is magnetized to an N-pole, and when a current in the other direction is made to flow through the coil 5, the magnetized poles are reversed. Thus, an attracting force is generated between the N-pole 6n/S-pole 6s of the rotary shaft member 6 and the S-pole/N-pole of the core member end 4a and a repulsive force is generated between the N-pole 6n/S-pole 6s of the rotary shaft member 6 and the N-pole/S-pole of the core member end 4a. Such a magnetic force causes the rotary shaft member 6 to rotate clockwise or counterclockwise.

When the light adjusting section 7 that rotates integrally with the rotary shaft member 6 comes into contact with the stopper 9, the light adjusting section 7 stops and the further counterclockwise rotation from the insertion position shown in FIG. 4 is restricted.

On the other hand, when the light adjusting section 7 that rotates integrally with the rotary shaft member 6 comes into contact with the stopper 8, the light adjusting section 7 stops and the further clockwise rotation from the retracted position shown in FIG. 5 is restricted.

Furthermore, changes that occur in the positions of the rotary shaft member 6 and the light adjusting section 7 in the optical axis direction depending on whether or not a current is applied to the coil 5 will be described with reference to FIG. 6 and FIG. 7. Here, FIG. 6 is a side view for describing a state in which the rotary shaft member 6 is attracted to the coil core member 4 side when no current is made to flow through the coil 5 and FIG. 7 is a diagram for describing a situation when the light adjusting section 7 rotates.

The rotary shaft member 6 is a permanent magnet and generates a magnetic field, and on the other hand, the coil core member 4 is formed of a magnetic body, and therefore a magnetic force (an attracting force in this case) is generated between the rotary shaft member 6 and the coil core member 4 even when no current is made to flow through the coil 5. The reason is because magnetization is caused by applying a magnetic field to the coil core member 4 formed of a magnetic body, whereby a magnetic pole appears which has polarity opposite to the polarity of the magnetic pole of the nearby permanent magnet.

Figure 6:
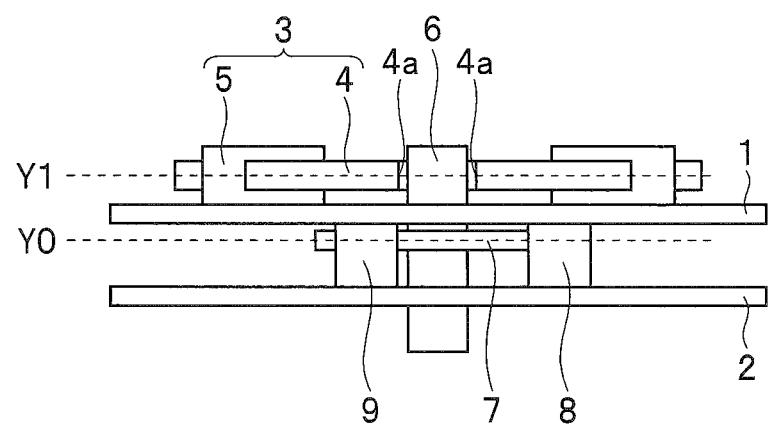
FIG. 6 is a side view for describing a state in which a rotary shaft member is attracted to a coil core member side when no current is made to flow through the coil according to embodiment 1 of the present invention.

The light adjusting section 7 is fixed at, for example, a center position Y0 in the axial direction of the rotary shaft member 6 as shown in FIG. 6.

In contrast, the core member ends 4a of the coil core member 4 sandwich the rotary shaft member 6 at a position Y1 offset upward in FIG. 6 from the center position Y0 in the axial direction of the rotary shaft member 6.

Therefore, the attracting force acting between the coil core member 4 and the rotary shaft member 6 when no current is made to flow through the coil 5 has a component in the axial direction that attracts the center position Y0 of the rotary shaft member 6 toward the position Y1 of the coil core member 4.

The operation that the rotary shaft member 6 and the light adjusting section 7 move in the optical axis direction under such an attracting force will be described with reference to FIG. 7. Fields A, D and E in FIG. 7 respectively show situations seen from an arrow D1 direction in FIG. 2 (downward direction) and fields B and C respectively show situations seen from an arrow D2 direction in FIG. 2 (direction from the shaft hole 1b toward the opening 1a in the horizontal direction). The field C shows a partially enlarged view of a region enclosed by a dotted line in the field B. The fields D1 to D4 show magnetic poles when the light adjusting section 7 moves from the insertion position to the retracted position and the fields E4 to E1 show magnetic poles when the light adjusting section 7 moves from the retracted position to the insertion position.

Figure 7:
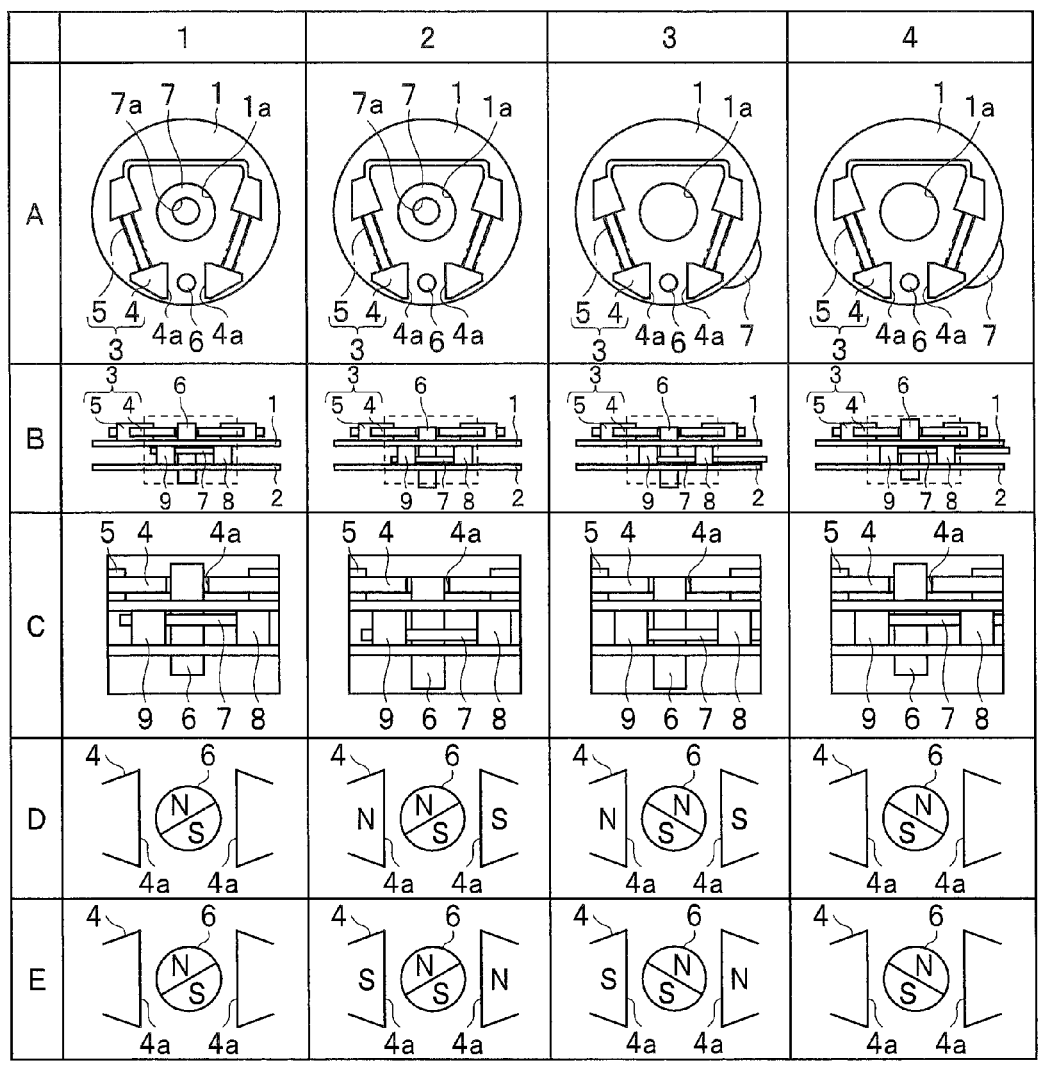
FIG. 7 is a diagram for describing a situation when the light adjusting section according to embodiment 1 of the present invention rotates.

The field 1 in FIG. 7 shows a situation in which the light adjusting section 7 is located at the insertion position and no current is made to flow through the coil 5. At this time, the coil 5 generates no magnetic field, an attracting force is acting between the rotary shaft member 6 and the coil core member 4 and the attracting force causes the light adjusting section 7 to approximate to the first substrate 1 side.

The field 2 in FIG. 7 shows a situation in which a current is made to flow through the coil 5 to move the light adjusting section 7 from the state shown in the field 1 in FIG. 7 to the retracted position.

At this time, the magnetic field generated from the coil 5 causes magnetization as shown in the field 2 in the core member end 4a of the coil core member 4, that is, an S-pole is generated in the core member end 4a which is proximate to the S-pole 6s of the rotary shaft member 6 and an N-pole is generated in the core member end 4a which is proximate to the N-pole 6n of the rotary shaft member 6, respectively. Therefore, it is a repulsive force that acts between the coil core member 4 and the rotary shaft member 6. For this reason, not only a force urging rotation around the axis but also a force urging movement toward the second substrate 2 side along the axial direction acts on the rotary shaft member 6. Therefore, as shown in the field C2, the rotary shaft member 6 and the light adjusting section 7 move to the positions proximate to the second substrate 2 side first and the light adjusting section 7 comes into contact with the second substrate 2 where the movement in the axial direction stops.

The field 3 in FIG. 7 shows a situation in which the light adjusting section 7 has moved from the state shown in the field 2 in FIG. 7 to the retracted position. At this time, a current continues to flow through the coil 5.

As described above, the light adjusting section 7 moves to the second substrate 2 side along the axial direction and then further rotates around the axis while in contact with the second substrate 2, arrives at the retracted position and comes into contact with the stopper 8 and stops rotation.

The field 4 in FIG. 7 shows a state in which the current flowing through the coil 5 has been stopped from the state shown in the field 3 in FIG. 7.

At this time, since the coil 5 has generated no magnetic field, magnetization due to the coil current has not been generated in the two core member ends 4a. An attracting force is generated between the rotary shaft member 6 which is a permanent magnet and the coil core member 4 formed of a magnetic body, and therefore the rotary shaft member 6 and the light adjusting section 7 move to positions proximate to the first substrate 1 side, and the light adjusting section 7 stops the movement in the axial direction when coming into contact with the first substrate 1.

Thus, the operation shown in FIG. 7 is performed when the two conditions are satisfied: (1) the center position Y0 in the axial direction of the rotary shaft member 6 is located offset from the axial direction position Y1 of the coil core member 4; and (2) there is a sufficient space between the first substrate 1 and the second substrate 2 that allows the light adjusting section 7 to move in the optical axis direction.

Figure 8:
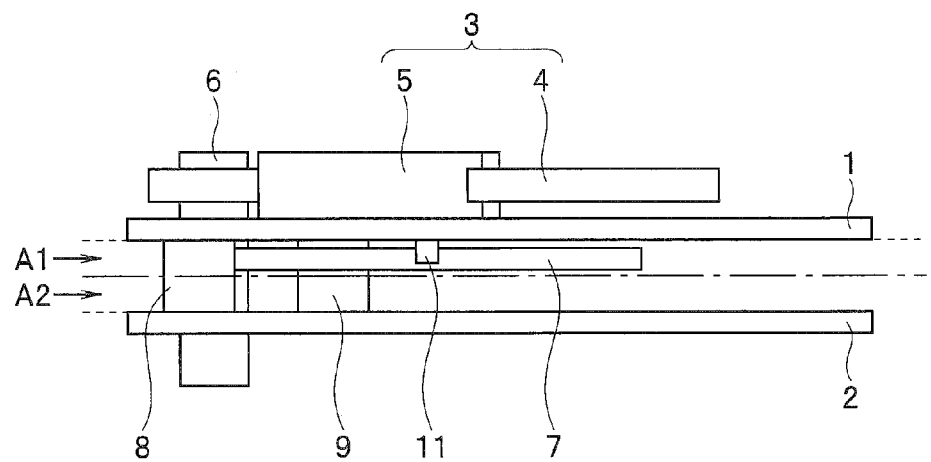
FIG. 8 is a side view for describing that the light adjusting section is located in different regions of a space between the first substrate and the second substrate when a current is made or not made to flow through the coil according to embodiment 1 of the present invention.

A configuration for locking the rotary shaft member 6 and the light adjusting section 7 that perform the above-described operation at the insertion position and the retracted position will be described with reference to FIG. 8 and FIG. 9. Here, FIG. 8 is a side view for describing that the light adjusting section 7 is located in different regions of the space between the first substrate 1 and the second substrate 2 when a current is flowing or not flowing through the coil 5 and FIG. 9 is a diagram for describing that rotation of the light adjusting section 7 is restricted when no current is made to flow through the coil 5 and rotation of the light adjusting section 7 is allowed when a current is made to flow through the coil 5.

Figure 9:
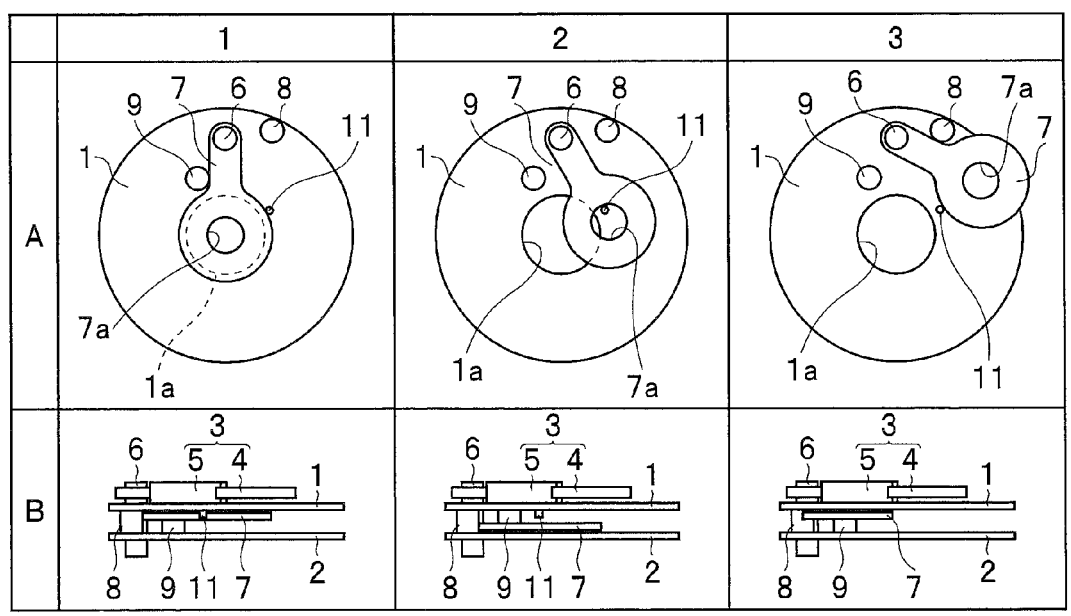
FIG. 9 is a diagram for describing that rotation of the light adjusting section is restricted when no current is made to flow through the coil and rotation of the light adjusting section is allowed when a current is made to flow through the coil according to embodiment 1 of the present invention.

Note that a field A in FIG. 9 shows a situation when the light adjusting apparatus from which the second substrate 2 is removed is seen from an arrow D3 direction in FIG. 2 (upward direction) and a field B shows a situation when the light adjusting apparatus is seen from an arrow D4 direction in FIG. 2 (direction perpendicular to a line connecting the shaft hole 1b and the opening 1a in the horizontal direction) respectively.

As described above, when no current is made to flow through the coil 5, the light adjusting section 7 in the optical axis direction in the space between the first substrate 1 and the second substrate 2 is located in a first region A1 which is a divided region on the first substrate 1 side, and when a current is made to flow through the coil 5, the light adjusting section 7 is located in a second region A2 which is a divided region on the second substrate 2 side.

Thus, a holding member 11 is provided which restricts the rotation from at least one of the insertion position and the retracted position of the light adjusting section 7 when the light adjusting section 7 is located in the first region A1 and allows the light adjusting section 7 to rotate when the light adjusting section 7 is located in the second region A2.

The holding member 11 is disposed on the first substrate 1 so as to extend in the direction of the first region A1 in the axial direction, located in a path of the light adjusting section 7 in the rotating direction when the light adjusting section 7 is located in the first region A1 to mechanically restrict the rotation of the light adjusting section 7.

To be more specific, the holding member 11 in the present embodiment constitutes a convex portion that protrudes from a surface (surface facing the second substrate 2) on the aforementioned space side of the first substrate 1 which is the substrate on which the electromagnetic drive source 3 is disposed.

Here, the length of the holding member 11 in the optical axis direction is smaller than the length resulting from subtracting the thickness of the light adjusting section 7 in the optical axis direction from the distance of the space between the first substrate 1 and the second substrate 2. When the holding member 11 is configured to satisfy the condition, the light adjusting section 7, when located in the second region A2, becomes rotatable without coming into contact with the holding member 11.

When the light adjusting section 7 is located at the insertion position and when no current is made to flow through the coil 5, the holding member 11 comes into contact with the light adjusting section 7 on one side in the first region A1 as shown in the field 1 in FIG. 9 and restricts the rotation of the light adjusting section 7 from the insertion position (counterclockwise rotation in the field A1 in FIG. 9).

Furthermore, when the light adjusting section 7 is located at the retracted position and when no current is made to flow through the coil 5, the holding member 11 comes into contact with the light adjusting section 7 in the first region A1 on the other side as shown in the field 3 in FIG. 9 and restricts the rotation of the light adjusting section 7 from the retracted position (clockwise rotation in the field A3 in FIG. 9).

When a current is made to flow through the coil 5, the light adjusting section 7 performs the aforementioned operation and moves in the optical axis direction from the first region A1 to the second region A2. At this time, the holding member 11 is not located in the rotation path of the light adjusting section 7 and the light adjusting section 7 rotates without being restricted by the holding member 11 as shown in the field 2 in FIG. 9.

According to such embodiment 1, when no current is made to flow through the coil 5, the holding member 11 restricts the rotation of the light adjusting section 7, and it is thus possible to hold the light adjusting section 7 to at least one of the insertion position and the retracted position.

Furthermore, since the rotary shaft member 6 is configured to move in the axial direction using a magnetic force acting between the rotary shaft member 6 made of an axial magnet and the coil core member 4 formed of a magnetic body in the electromagnetic drive source 3 configured to rotate the rotary shaft member 6, there is no need for a special mechanism to move the rotary shaft member 6 in the axial direction, providing an advantage that the configuration is simple.

Furthermore, the holding member 11 is made to extend in the axial direction toward the first region A1 to mechanically restrict the rotation of the light adjusting section 7, thus making it possible to reliably restrict the rotation of the light adjusting section 7.

In addition, since the rotation of the light adjusting section 7 from the insertion position and the rotation from the retracted position can be restricted by the one holding member 11, it is not necessary to provide the holding member 11 in plurality and thus simplify the configuration.

Since the holding member 11 is disposed in the space between the first substrate 1 and the second substrate 2 (the first region A1 in more restrictive terms), there is also an advantage that the size in the diameter direction and the size in the optical axis direction of the light adjusting apparatus are not changed.

Thus, it is possible to prevent inadvertent movement of the light adjusting section 7 when power is off

[Embodiment 2]

Figure 10:
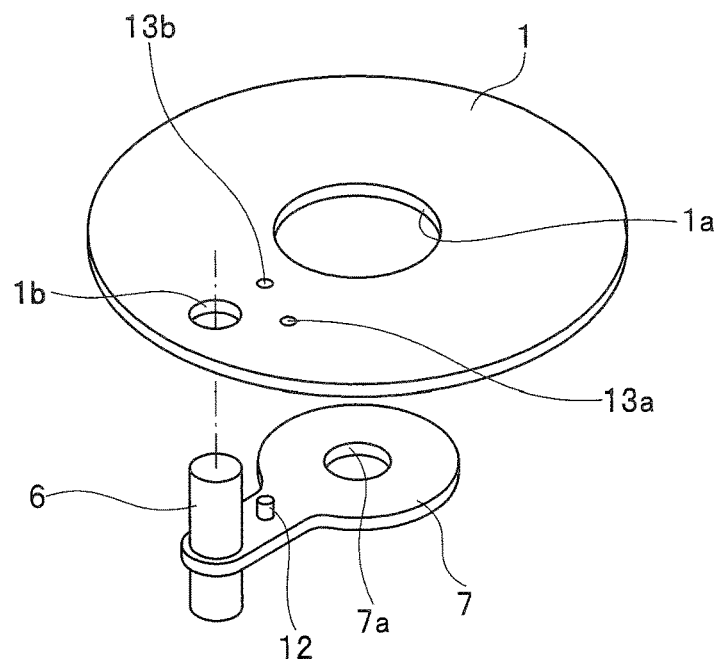
FIG. 10 is an exploded perspective view for describing a configuration of a holding member according to embodiment 2 of the present invention.

FIG. 10 illustrates embodiment 2 of the present invention and is an exploded perspective view for describing a configuration of a holding member. In embodiment 2, parts similar to the parts in aforementioned embodiment 1 are assigned identical reference numerals, description of similar parts will be omitted as appropriate, and only different parts will be mainly described.

In aforementioned embodiment 1, the holding member 11 is disposed on the first substrate 1 which is the substrate on which the electromagnetic drive source 3 is disposed, in the present embodiment, a holding member 12 is provided on a surface of the light adjusting section 7 on the electromagnetic drive source 3 side.

The holding member 12 of the present embodiment is disposed on the light adjusting section 7 so as to extend toward the direction of the first region A1 in the axial direction and is configured to mechanically restrict the rotation of the light adjusting section 7 when the light adjusting section 7 is located in the first region A1.

To be more specific, the holding member 12 is provided on the surface of the light adjusting section 7 on the first substrate 1 side so as to protrude toward the axial direction.

On the other hand, restricting shape portions 13a and 13b into which the holding member 12 can be fitted are formed on the first substrate 1. The restricting shape portion 13a when the holding member 12 is fitted in the restricting shape portion 13a is intended to restrict the rotation of the light adjusting section 7 located in the first region A1 and lock the light adjusting section 7 at the retracted position, and the restricting shape portion 13b when the holding member 12 is fitted in the restricting shape portion 13b is intended to restrict the rotation of the light adjusting section 7 located in the first region A1 and lock the light adjusting section 7 at the insertion position.

When a current is made to flow through the coil 5, a repulsive force acts between the electromagnetic drive source 3 and the rotary shaft member 6, whereby the light adjusting section 7 moves along the axial direction from the first region A1 to the second region A2, disengages the holding member 12 from the restricting shape portion 13a or the restricting shape portion 13b and allows the rotary shaft member 6 and the light adjusting section 7 to rotate, which is substantially the same as aforementioned embodiment 1.

According to such embodiment 2, by providing the light adjusting section 7 with the holding member 12 and providing the first substrate 1 with the restricting shape portions 13a and 13b, it is also possible to mechanically restrict the rotation of the light adjusting section 7 when no current is made to flow through the coil 5 in substantially the same way as aforementioned embodiment 1.

[Embodiment 3]

Figure 11:
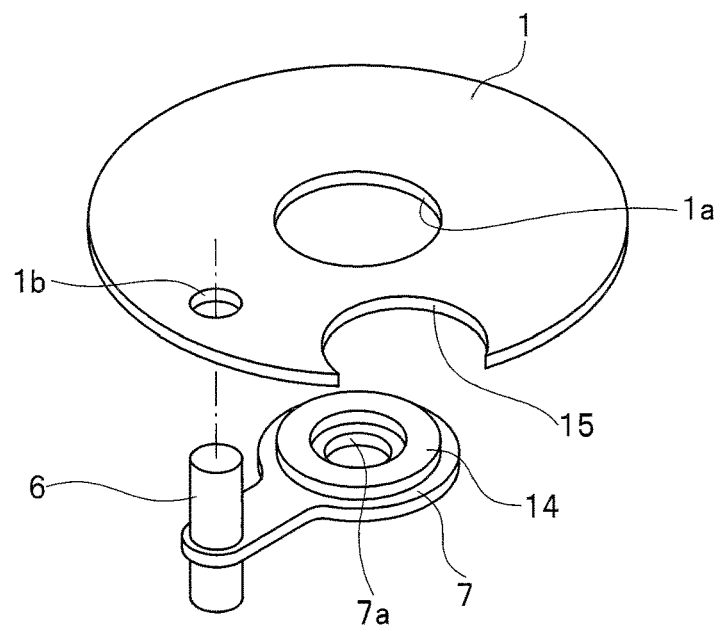
FIG. 11 is an exploded perspective view for describing a configuration of a holding member according to embodiment 3 of the present invention.

FIG. 11 illustrates embodiment 3 of the present invention and is an exploded perspective view for describing a configuration of a holding member. In embodiment 3, parts similar to the parts in aforementioned embodiments 1 and 2 are assigned identical reference numerals, description of similar parts will be omitted as appropriate, and only different parts will be mainly described.

A holding member 14 of the present embodiment is also provided on a surface of the light adjusting section 7 on the electromagnetic drive source 3 side as in the case of the holding member 12 of aforementioned embodiment 2, whereas the holding member 14 is configured to have a shape in which the restricting shape portion 13b is transformed so as to also function as the opening 1a of the first substrate 1.

That is, the holding member 14 has a convex shape part formed into a circle so as to surround a diaphragm opening 7a, the diameter of an outer circumference of which is a diameter that allows the holding member 14 to fit into the opening 1a of the first substrate 1 with substantially no gap (that is, the diameter substantially equal to the diameter of the opening 1a).

On the other hand, the opening 1a of the first substrate 1 that passes light also functions as a restricting shape portion configured to restrict the rotation of the light adjusting section 7 from the insertion position.

Furthermore, the first substrate 1 is provided with a restricting shape portion 15 configured to restrict the rotation of the light adjusting section 7 from the retracted position as an arcuate notch having the same diameter as the diameter of the opening 1a.

When such a configuration is adopted, positioning of the light adjusting section 7 at the insertion position can be performed through the engagement between the holding member 14 and the opening 1a of the first substrate 1 (especially when the opening 1a is an optical opening that has the function as an open diaphragm, it is possible to perform positioning with high accuracy). Similarly, positioning of the light adjusting section 7 at the retracted position can be performed through the engagement between the holding member 14 and the restricting shape portion 15 of the first substrate 1.

Therefore, the stoppers 8 and 9 can be omitted in the present embodiment.

According to such embodiment 3, it is possible to exert substantially the same effects as the effects of aforementioned embodiment 2 and the opening 1a of the first substrate 1 also functions as the restricting shape portion, which eliminates the need for separately providing a configuration to restrict the light adjusting section 7 at the insertion position and can simplify the configuration.

Moreover, the stoppers 8 and 9 can also be omitted, thus providing an advantage of further simplifying the configuration.

[Embodiment 4]

Figure 12:
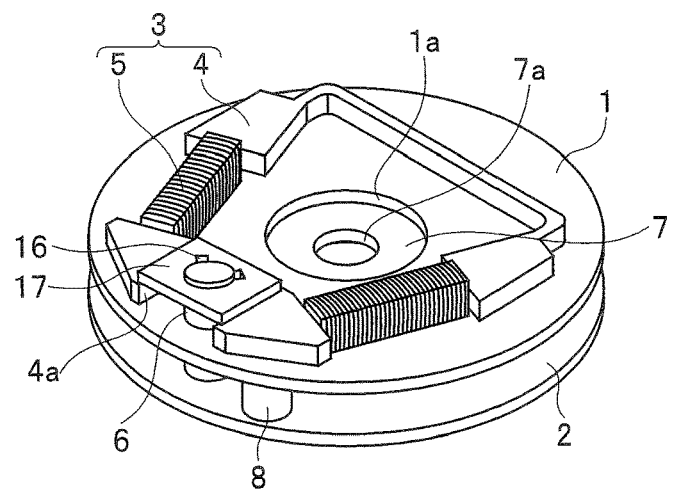
FIG. 12 is a perspective view illustrating a configuration of a light adjusting apparatus according to embodiment 4 of the present invention.
Figure 13:
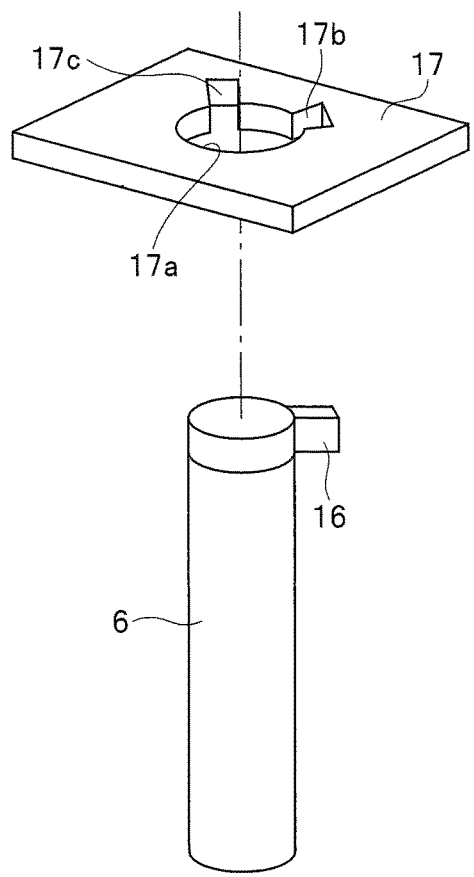
FIG. 13 is an exploded perspective view for describing a configuration of a holding member according to embodiment 4 of the present invention.

FIG. 12 and FIG. 13 illustrate embodiment 4 of the present invention, FIG. 12 is a perspective view illustrating a configuration of a light adjusting apparatus and FIG. 13 is an exploded perspective view for describing a configuration of a holding member. In embodiment 4, parts similar to the parts in aforementioned embodiments 1 to 3 are assigned identical reference numerals, description will be omitted as appropriate, and only different parts will be mainly described.

In aforementioned embodiment 1, the holding member 11 is provided on the first substrate 1, in aforementioned embodiments 2 and 3, the holding member 12 or the holding member 14 is provided on the light adjusting section 7, whereas in the present embodiment, a holding member 16 is provided on the rotary shaft member 6.

That is, the holding member 16 is provided so as to protrude in the diameter direction from the circumferential surface of an end portion of the rotary shaft member 6 on the electromagnetic drive source 3 side in the axial direction.

On the other hand, a holding receiving member 17 is fixed at a top of the electromagnetic drive source 3 in FIG. 12 including the core member ends 4a that sandwich the rotary shaft member 6.

The holding receiving member 17 is provided with a circular hole 17a into which the rotary shaft member 6 can be fitted, and a restricting shape portion 17b configured to engage with the holding member 16 and mechanically restrict the rotation of the rotary shaft member 6 when the light adjusting section 7 is located at the retracted position in the first region A1 and a restricting shape portion 17c configured to engage with the holding member 16 and mechanically restrict the rotation of the rotary shaft member 6 when the light adjusting section 7 is located at the insertion position in the first region A1 are formed at predetermined angle positions in the circumferential direction of the circular hole 17a.

With such a configuration, when the light adjusting section 7 is located at the retracted position and when no current is made to flow through the coil 5, the rotary shaft member 6 moves upward in FIG. 12 and FIG. 13, the holding member 16 engages with the restricting shape portion 17b, restricts the rotation of the rotary shaft member 6, and by extension, restricts the rotation of the light adjusting section 7 from the retracted position.

Similarly, when the light adjusting section 7 is located at the insertion position and when no current is made to flow through the coil 5, the rotary shaft member 6 moves upward in FIG. 12 and FIG. 13, the holding member 16 engages with the restricting shape portion 17c, restricts the rotation of the rotary shaft member 6, and by extension, restricts the rotation of the light adjusting section 7 from the insertion position.

When a current is made to flow through the coil 5, a repulsive force acts between the electromagnetic drive source 3 and the rotary shaft member 6, the rotary shaft member 6 moves downward in FIG. 12 and FIG. 13 (at this time, the light adjusting section 7 moves from the first region A1 to the second region A2 along the axial direction), the top end of the rotary shaft member 6 exits the circular hole 17a of the holding receiving member 17, that is, the holding member 16 disengages from the restricting shape portion 17b or the restricting shape portion 17c. Thus, the rotary shaft member 6 and the light adjusting section 7 are allowed to rotate in substantially the same way as in the aforementioned embodiments.

According to such embodiment 4, by providing the holding member 16 on the rotary shaft member 6 and separately providing the holding receiving member 17 including the restricting shape portions 17b and 17c that can engage with the holding member 16, it is possible to mechanically restrict the rotation of the light adjusting section 7 when no current is made to flow through the coil 5 in substantially the same way as in aforementioned embodiments 1 to 3.

[Modification]

Figure 14:
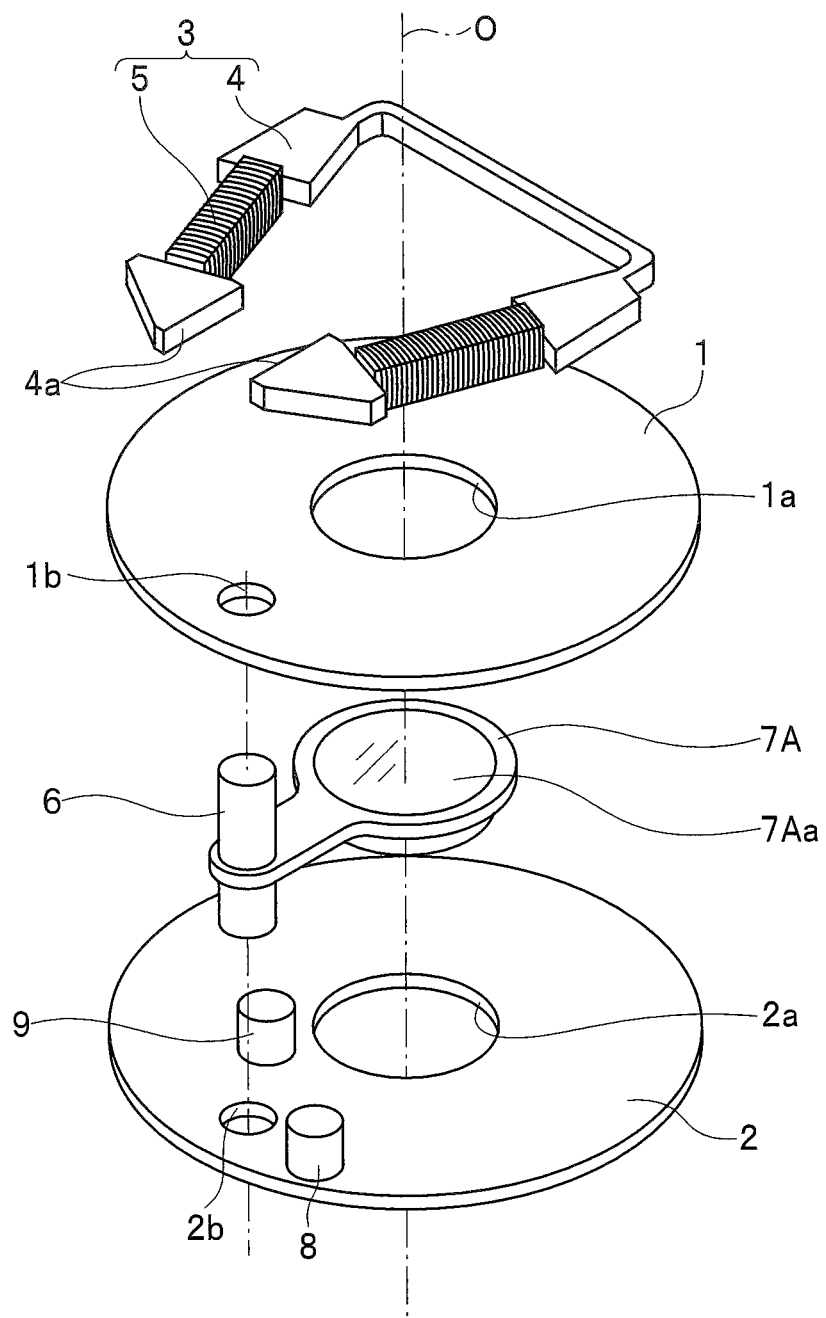
FIG. 14 is a perspective view illustrating another configuration example of a light adjusting section applicable to each of the embodiments of the present invention.

FIG. 14 is a perspective view illustrating another configuration example of a light adjusting section applicable to each of the above-described embodiments.

In aforementioned embodiments 1 to 4, the light adjusting section 7 is constructed of a diaphragm blade provided with the diaphragm opening 7a, whereas a light adjusting section 7A according to a modification shown in FIG. 14 adopts a configuration provided with an optical lens (or may also be an optical filter) 7Aa.

Thus, an optical element provided with the function of adjusting light such as a diaphragm, a lens, a filter or a shutter is widely applicable to the light adjusting section.

Note that in the case of the configuration shown in FIG. 14, the optical lens (or optical filter) 7Aa protrudes on an undersurface side of the light adjusting section 7A, but, in contrast, if the optical lens (or optical filter) 7Aa is disposed so as to protrude on the top surface side, the optical lens (or optical filter) 7Aa itself can be further configured to also function as the holding member as in the case of aforementioned embodiment 3. In this case, an outer circumferential diameter of the optical lens (or optical filter) 7Aa is made to have substantially the same diameter as the diameter of the opening 1a. At this time, it goes without saying that the restricting shape portion 15 shown in FIG. 11 of embodiment 3 may further be provided on the first substrate 1.

Thus, the optical performance of the main optical system can be changed to desired performance using the various light adjusting sections.

Note that the present invention is not limited to the above-described embodiments as described, but can also be implemented by modifying the components without departing from the spirit and scope of the invention in the practical stage. Furthermore, various aspects of the invention can be formed through an appropriate combination of a plurality of components disclosed in the above-described embodiments. For example, several components may be deleted from all the components shown in the embodiments. Moreover, components among different embodiments may be combined as appropriate. Thus, it goes without saying that various modifications and applications are possible without departing from the spirit and scope of the present invention.

What is claimed is:

1. A light adjusting apparatus comprising:
    a first substrate and a second substrate arranged in parallel at a predetermined distance to define a space between the first substrate and the second substrate, each of the first substrate and the second substrate including an opening formed to pass light;
    a rotary shaft member rotatable around a central axis of rotation perpendicular to the first substrate and the second substrate;
    a light adjusting section rotatably movable with the rotary shaft member, the light adjusting section being configured to move between an insertion position located in an optical path of light passing through the opening and a retracted position retracted from the optical path as the rotary shaft member rotates, to adjust and output incident light incident from the opening, the light adjusting section being configured to be movable in an axial direction of the rotary shaft member with the rotary shaft member; and
    a holding member configured to restrict rotation from at least one of the insertion position and the retracted position of the light adjusting section when the light adjusting section is located in a first region of the space, and allow the light adjusting section to rotate when the light adjusting section is located in a second region of the space, wherein the space is divided into the first region and the second region at different positions in the axial direction such that the first region is closer to the first substrate than the second substrate and the second region is closer to the second substrate than the first substrate.

2. The light adjusting apparatus according to claim 1, further comprising:
a coil core member made of a magnetic body comprising two core member ends configured to contactlessly sandwich side faces of the rotary shaft member;
a coil wound around the coil core member; and
an electromagnetic drive source disposed on a surface opposite to the space of the first substrate,
wherein the rotary shaft member comprises an axial magnet magnetized so as to have different magnetic poles around an axis, rotatably attached to the first substrate and the second substrate so as to be sandwiched between the two core member ends at a position offset from a center in the axial direction and configured to rotate by a magnetic force generated when a current is made to flow through the coil and transmitted via the coil core member, and
the magnetic poles around the axis of the rotary shaft member are configured such that at the retracted position, when a current that causes the rotary shaft member to rotate from the retracted position to the insertion position is made to flow through the coil, a repulsive force in the axial direction directed from the first region to the second region acts, and at the insertion position, when a current that causes the rotary shaft member to rotate from the insertion position to the retracted position is made to flow through the coil, a repulsive force in the axial direction directed from the first region to the second region acts, and when no current is made to flow through the coil, an attracting force in the axial direction directed from the second region to the first region acts due to magnetic action acting between the rotary shaft member and the coil core member made of a magnetic body.

3. The light adjusting apparatus according to claim 2, wherein the holding member is disposed on at least one of the first substrate and the light adjusting section so as to extend toward the first region in the axial direction to mechanically restrict the rotation of the light adjusting section when the light adjusting section is located in the first region.

4. The light adjusting apparatus according to claim 3, wherein the holding member is disposed so as to protrude on a surface of the first substrate on the space side, is located in a path of the light adjusting section in a rotating direction in the first region, comes into contact with the light adjusting section on one side face at the insertion position and comes into contact with the light adjusting section on another side face at the retracted position to restrict the rotation of the light adjusting section from the insertion position and the rotation from the retracted position.

5. The light adjusting apparatus according to claim 3, wherein the holding member is disposed so as to protrude on a surface of the light adjusting section on the first substrate side,
a restricting shape portion into which the holding member can be fitted is formed on the first substrate, and
when the light adjusting section is located at at least one of the insertion position and the retracted position in the first region, the holding member is fitted into the restricting shape portion to restrict the rotation of the light adjusting section.

6. The light adjusting apparatus according to claim 5, wherein the opening that allows light of the first substrate to pass also functions as the restricting shape portion configured to restrict the rotation of the light adjusting section from the insertion position.

7. The light adjusting apparatus according to claim 2, wherein the holding member is disposed so as to protrude in a diameter direction from the rotary shaft member, and
the light adjusting apparatus further comprises a holding receiving member comprising a restricting shape portion configured to engage with the holding member, when the light adjusting section is located at at least one of the insertion position and the retracted position in the first region and mechanically restrict the rotation of the rotary shaft member.

* * * * *